(12) United States Patent
Park

(10) Patent No.: US 9,493,311 B1
(45) Date of Patent: Nov. 15, 2016

(54) FODDER-FEEDING DISC WIRE DRIVING DEVICE HAVING TENSION MANAGEMENT UNIT

(71) Applicant: Jang Chun Park, Gunpo (KR)

(72) Inventor: Jang Chun Park, Gunpo (KR)

( * ) Notice: Subject to any disclaimer, the term of this patent is extended or adjusted under 35 U.S.C. 154(b) by 0 days.

(21) Appl. No.: 14/924,829

(22) Filed: Oct. 28, 2015

(30) Foreign Application Priority Data

Oct. 1, 2015 (KR) ......................... 10-2015-0138498

(51) Int. Cl.
*B65G 23/44* (2006.01)
*B65G 19/14* (2006.01)
*B65G 43/02* (2006.01)
*A01K 39/01* (2006.01)

(52) U.S. Cl.
CPC ............. *B65G 23/44* (2013.01); *A01K 39/01* (2013.01); *B65G 19/14* (2013.01); *B65G 43/02* (2013.01)

(58) Field of Classification Search
CPC ......... B65G 23/44; B65G 19/14; A01K 5/02
USPC ................................. 198/813, 814, 810.04
See application file for complete search history.

(56) References Cited

U.S. PATENT DOCUMENTS 6,832,659 B1 * 12/2004 Bares .................. B62D 55/084
180/19.1

FOREIGN PATENT DOCUMENTS

| KR | 20030006912 A | * | 1/2003 |
| KR | 20-0317682 | | 6/2003 |
| KR | 20-0401374 | | 11/2005 |

* cited by examiner

*Primary Examiner* — Gene Crawford
*Assistant Examiner* — Lester Rushin
(74) *Attorney, Agent, or Firm* — Lex IP Meister, PLLC

(57) ABSTRACT

The present invention generally relates to a fodder-feeding disc wire driving device having a tension management unit, the driving device including: a drive motor; a drive sprocket having multiple protrusions on a circumference thereof; an idle wheel provided at a position adjacent to the drive sprocket such that the disc wire moved by the drive sprocket passes over the idle wheel; a tension adjustment unit connected to a central shaft of the idle wheel, the tension adjustment unit being movably provided on a line extending between a central axis of the drive sprocket and a central axis of the idle wheel; a casing having a disc wire inlet and a disc wire outlet; a tension measurement unit mechanically provided between the casing and the tension adjustment unit.

2 Claims, 4 Drawing Sheets

FODDER-FEEDING DISC WIRE DRIVING DEVICE HAVING TENSION MANAGEMENT UNIT

BACKGROUND OF THE INVENTION

1. Field of the Invention

The present invention generally relates to a fodder-feeding disc wire driving device having a tension management unit. More particularly, the present invention relates to a fodder-feeding disc wire driving device having a tension management unit that can determine when repair and maintenance are needed, and can adjust tension of the disc wire conveying fodder by allowing an operator to visually check the moving distance of an idle wheel by naked eye.

2. Description of the Related Art

Generally, when poultry are raised on a large scale in livestock housings, there is a shortage of manpower to manually feed fodder to the livestock, and thus labor cost increases. Accordingly, an automated fodder feeder unit is required.

To meet the need mentioned above, an automatic poultry feeder is supplied to a poultry shed. The automatic poultry feeder is a device for automatically feeding fodder to the poultry to reduce labor cost, and is arranged at multiple predetermined positions. The automatic poultry feeder may be constructed in various types such as a chain type, a disc wire type, a screw type, and a suspension type feeder.

As an example, a system for automatically feeding poultry fodder is shown in FIG. 1 as a basic technical matter disclosed in Patent Document 1.

The configuration and operation of the system are described here. Fodder is stored in a fodder storage tank 10, and the fodder is discharged from the fodder storage tank 10 by a hopper 20, which is attached to the lower part of the fodder storage tank 10. Here, the exit of the hopper 20 is connected to a conveying pipeline 30 that includes multiple conveying pipes consecutively connected to each other and arranged at positions where the fodder is required. Then, a last conveying pipe of the conveying pipeline 30 is connected to the entrance of the hopper 20 outside of a shed 70. Accordingly, the conveying pipeline is configured in a closed curve. Here, at corners where the conveying pipeline 30 changes direction, a corner wheel 31 is used to connect the conveying pipes of the pipeline 30 such that the fodder can be efficiently conveyed. Further, after fodder is stored in multiple fodder measurement boxes 50 installed in the shed 70, a predetermined amount of the fodder is conveyed to respective fodder containers 60.

Here, a wire 41 lies in the conveying pipes of the pipeline 30 in longitudinal directions of the conveying pipes throughout the conveying pipeline 30, and discs 43 are fixed on a disc wire 40 conveying fodder and at regular intervals in longitudinal directions of the wire 41. The discs 43 push and convey the fodder when the disc wire 40 moves ahead through the inside of the conveying pipeline 30.

In addition, the wire 41 is driven by a driving device 100. The driving device 100 is driven by a well-known deceleration motor powered by electric power, and the driving force of the deceleration motor is transmitted to a drive sprocket 120 located in the driving device 100. When the driving force drives the drive sprocket 120 to rotate, the discs 43 of the wire 41, which are introduced into the driving device 100 through a disc wire inlet of the driving device 100, move while periodically engaging with protrusions of the drive sprocket 120, formed on the circumference of the drive sprocket 120 in radial directions, thereby moving the entirety of the wire 41. The wire 41 departing from the drive sprocket 120 is guided by an outer circumferential surface of an idle wheel 130 and is discharged from the driving device through a disc wire outlet of the driving device 100. Then, the wire 41 is introduced into the hopper 20. Accordingly, by passing through the entire length of the inside of the conveying pipeline 30 configured in a closed curve, the wire conveys the fodder, supplied by the hopper 20, to the place where the fodder is required.

Though such an automatic poultry feeder has been proposed in various structures and ways, as disclosed in Patent Document 2, an automatic poultry feeder widely used in recent years is configured in such a manner that fodder can be supplied by the disc wire 40 circulating in the pipeline 30.

Meanwhile, for another example disclosed in Patent Document 2, a driving device 100 includes a motor and a drive sprocket 120. Here, the motor produces a rotational force to drive a disc wire 40, and the drive sprocket 120 is rotated by the rotational force of the motor, pulling and moving the disc wire 40 forward.

However, in Patent Document 2, since the entire length of the disc wire 40 is very long, strong tension is generated in the disc wire during the movement thereof. Accordingly, when the disc wire 40 is used for a long period, the length of the disc wire 40 increases, and thus when compared to a new disc wire, the disc wire becomes weak in the transmission of driving force, or the disc wire slips from the drive sprocket 120. Accordingly, the disc wire 40 stops its operation, or the discs 43 of the disc wire become tangled, thus overloading the motor, which may break the motor and lead to a fire.

That is, as the entire length of the disc wire 40 increases, the disc wire 40 partially slips from the drive sprocket 120, and thus the disc wire 40 becomes tangled with the drive sprocket 120 and is disconnected, or the discs 43 of the disc wire 40 are damaged or broken, thereby causing malfunction of the driving device 10 and interrupting fodder feeding. To prevent the above-mentioned issues, a stockbreeder has to frequently check the appearance of the driving device by naked eye, and when the elongation of the disc wire occurs, the stockbreeder must cut away the elongated part of the disc wire to maintain the tension thereof.

Accordingly, to identify the elongated part of the disc wire, the stockbreeder is required to remove a cover of the driving device to check the inside of the driving device. Due to such inconvenience, the stockbreeder may not repair the wire timely, and thus damage or breakage of the driving device may frequently occur or the driving device may catch fire.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Utility Model Registration No. 20-0401374 Y1; and (Patent Document 2) Korean Utility Model Registration No. 20-0317682 Y1.

SUMMARY OF THE INVENTION

Accordingly, the present invention has been made keeping in mind the above problems occurring in the related art, and the present invention is intended to propose a fodder-feeding disc wire driving device having a tension management unit that can determine when repair and maintenance are needed, and can adjust tension of a disc wire conveying fodder to keep the tension of the disc wire steady by allowing an operator to visually check the moving distance of an idle wheel by naked eye.

In order to achieve the above object, according to an embodiment of the present invention, there is provided a fodder-feeding disc wire driving device having a tension management unit, the driving device including:

In order to achieve the above object, according to an embodiment of the present invention, there is provided a fodder-feeding disc wire driving device having a tension management unit, the driving device including: a drive motor; a drive sprocket having multiple protrusions on a circumference thereof, the drive sprocket being rotatable by being connected to a drive motor, wherein discs provided on a disc wire engage with the multiple protrusions so that the disc wire conveys fodder; an idle wheel provided at a position adjacent to the drive sprocket such that the disc wire moved by the drive sprocket passes over the idle wheel, wherein the idle wheel is rotated by a rotational force of the drive sprocket transmitted to the idle wheel by the disc wire; a tension adjustment unit connected to a central shaft of the idle wheel, the tension adjustment unit being movably provided on a line extending between a central axis of the drive sprocket and a central axis of the idle wheel, wherein the tension adjustment unit constantly maintains tension of the disc wire by moving the idle wheel away from the drive sprocket by using an elastic force of a spring; a casing having a disc wire inlet and a disc wire outlet so that after the disc wire is introduced into the casing, and passes over both the drive sprocket and the idle wheel, the disc wire is discharged from the casing, with the drive motor, the drive sprocket, the idle wheel, and the tension adjustment unit being put in the casing; and a tension measurement unit mechanically provided between the casing and the tension adjustment unit, the tension measurement unit enabling tension state of the disc wire to be checked with a naked eye, and enabling a timing of maintenance of the disc wire and a timing of tension adjustment of the idle wheel to be determined.

Here, the tension measurement unit may include: a gauge hole having a scale and provided at a predetermined position of the casing, the gauge hole being configured in a longitudinal hole shape in the same direction as a moving direction of the idle wheel; and an indication protrusion provided by extending from the moving plate of the tension adjustment unit, the indication protrusion protruding through the gauge hole from the moving plate.

By proposing the driving device configured as mentioned above according to present invention, the time when the disc wire is elongated due to a long period of use can be identified by naked eye. Accordingly, a user can easily determine when repair and maintenance of the disc wire are needed and when adjustment of the tension of the idle wheel is needed, thereby preventing the driving device from being damaged or broken, or from catching fire.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
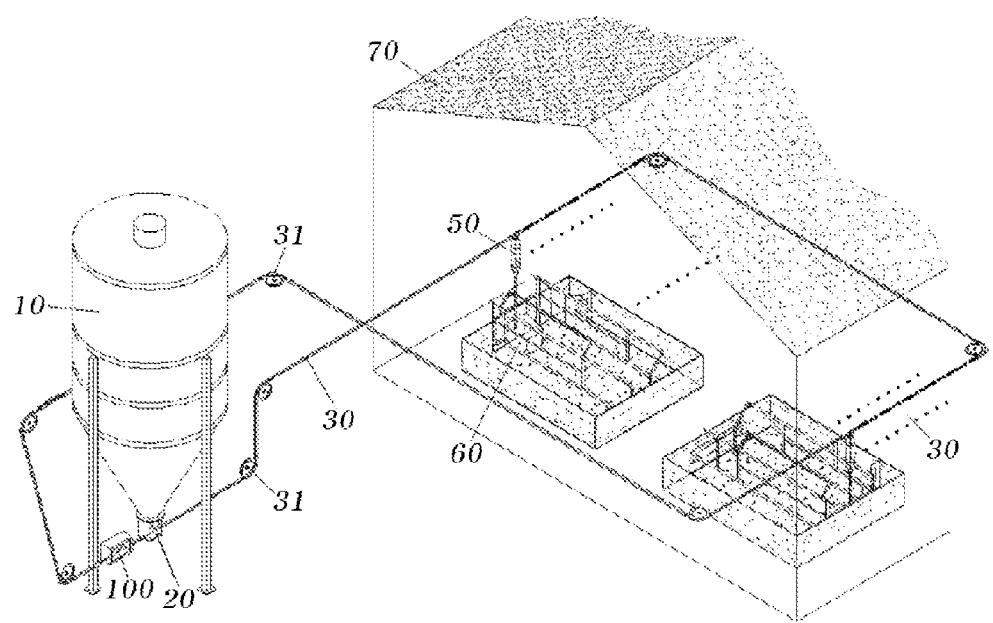
FIG. 1 is a view showing an automatic poultry feeder including a driving device of a conventional disc wire.

Hereinbelow, an exemplary embodiment of the present invention will be described in detail with reference to the accompanying drawings. Throughout the drawings, the same reference numerals will refer to the same or like parts.

First, as shown in FIG. 1, a normal fodder feeder of the present invention relates to a disc wire driving device 100 used to feed fodder. With the disc wire 40 circulating along a closed curve of a conveying pipeline 30, when the fodder is supplied, a tension management unit of the driving device 100 prevents the disc wire 40 from slipping from a drive sprocket 120, and the driving device 100 conveying the disc wire 40 from being damaged.

To achieve the above-mentioned object, a fodder-feeding disc wire driving device 100 is constructed in such a manner that when a disc wire 40 feeds fodder while moving along a conveying pipeline 30 configured in a closed curve, the disc wire 40 passes over an idle wheel 130. In this case, the idle wheel 130 is automatically moved as much as the amount of tension generated in the disc wire 40 to maintain tension of the disc wire 40.

In this case, when length of the disc wire 40 increases, the idle wheel 130 prevents the disc wire 40 from deviating from a normal course, thereby preventing the disc wire 40 from being damaged or tangled, and the driving device 100 from malfunctioning or catching fire due to overheating.

Figure 2:
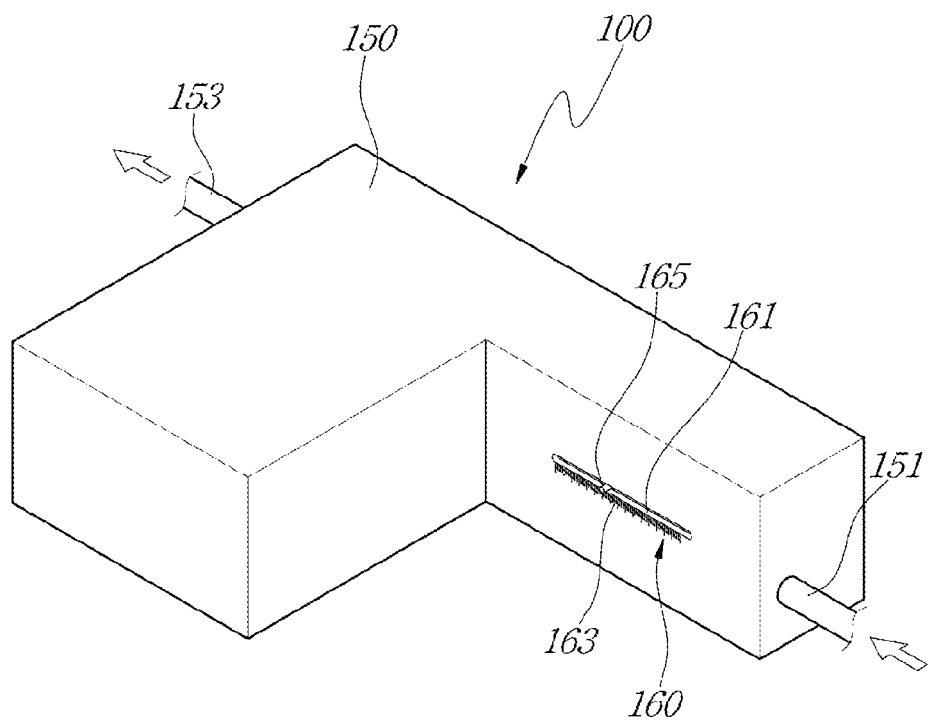
FIG. 2 is a perspective view showing a driving device of a disc wire according to the present invention.
Figure 3:
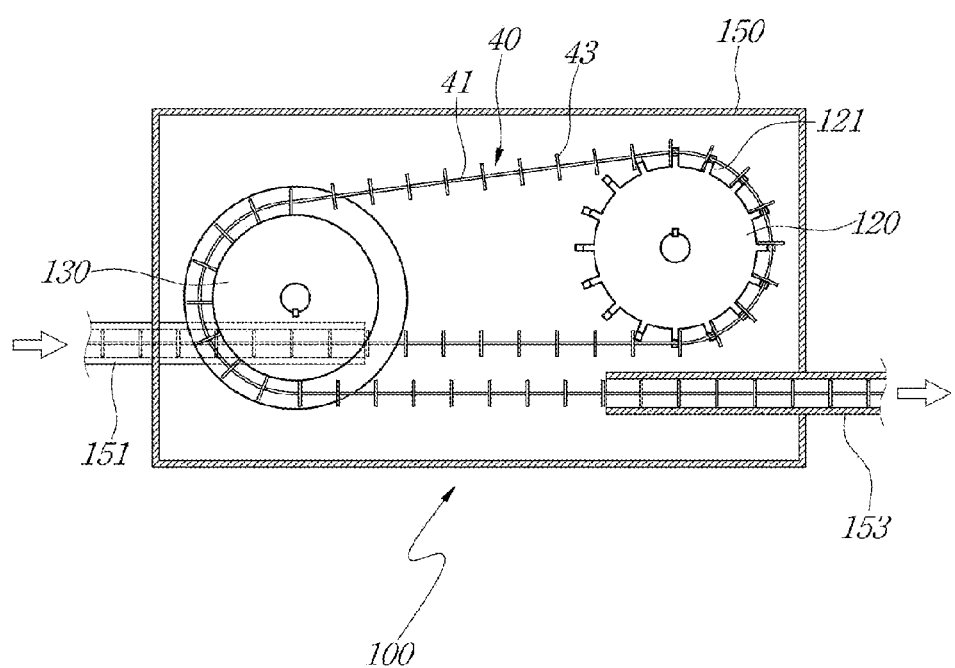
FIG. 3 is a side sectional view showing the driving device of the disc wire according to the present invention.
Figure 4:
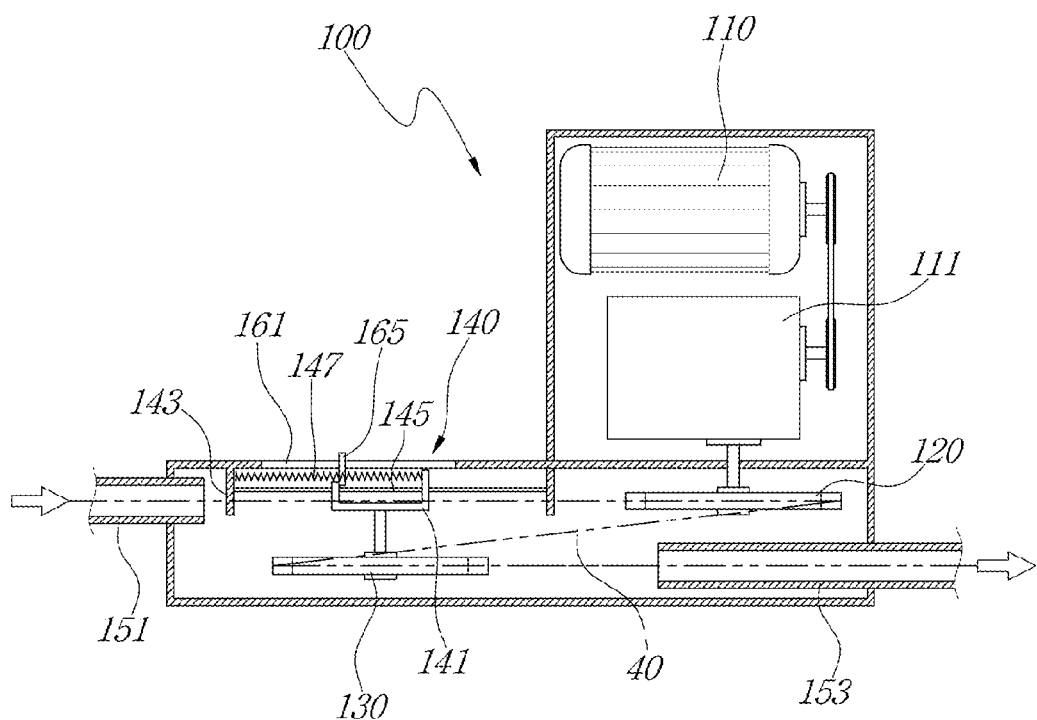
FIG. 4 is a plan sectional view showing the driving device of the disc wire according to the present invention.

Accordingly, as shown in FIGS. 2 to 4, the fodder-feeding disc wire driving device 100 used to feed fodder includes a drive motor 110 generating a driving force; and a drive sprocket 120, the drive sprocket 120 having multiple protrusions along a circumference thereof and mounted to the drive motor 110 to be rotatable by being connected to the drive motor 110 such that the drive sprocket can convey the fodder by engaging with the discs 43 formed on the disc wire 40.

Further, an idle wheel is provided at a position adjacent to the drive sprocket such that the disc wire moved by the drive sprocket passes over the idle wheel. Here, the idle wheel is rotated by a rotational force of the drive sprocket transmitted to the idle wheel by the disc wire.

Here, a tension adjustment unit 140 is connected to a central shaft of the idle wheel 130, the tension adjustment unit being movably provided on a line extending between a central axis of the drive sprocket and a central axis of the idle wheel. The tension adjustment unit constantly maintains tension of the disc wire 40 by moving the idle wheel 130 away from the drive sprocket 120 by using an elastic force of a spring 147.

In addition, a casing 150 having a disc wire inlet 151 and a disc wire outlet 153 is provided so that after the disc wire 40 is introduced into the casing, and passes over both the drive sprocket 120 and the idle wheel 130, the disc wire is discharged from the casing, the drive motor 110, the drive sprocket 120, the idle wheel 130, and the tension adjustment unit 140 being located in the casing.

Here, a tension measurement unit 160 mechanically provided between the casing 150 and the tension adjustment unit 140, the tension measurement unit enabling tension state of the disc wire 40 to be checked by naked eye, and enabling determination of when maintenance of the disc wire and adjustment of tension of the idle wheel 130 are required.

Accordingly, as shown in the driving device 100 of the disc wire 40 of the present invention, the driving device 100 includes: the drive motor 110 generating the driving force; and the drive sprocket 120 rotated by drive motor 110 and pulling and driving the disc wire 40.

Further, the drive sprocket 120 of the present invention includes the same protrusions 121 as a drive sprocket 120 provided in the driving device 100 of a normal disc wire 40. The protrusions 121 are formed at an interval corresponding to a pitch between the discs 43 formed on the disc wire 40, so that when the disc wire 40 passes over the drive sprocket 120, the discs 43 efficiently engage with the protrusions 121.

In this case, the main reason the disc wire 40 deviates from a normal course is that during movement of the disc wire 40, when the amount of tension generated in the disc wire 40 exceeds a predetermined level, the disc wire 40 loosens.

Accordingly, the idle wheel 130 and the tension adjustment unit 140 are required to maintain tension of the disc wire 40 even when the disc wire 40 is elongated.

To achieve the above-mentioned object, the driving device 100 includes: the idle wheel 130 that the disc wire 40 passes over while moving; and the tension adjustment unit 140 constructed such that the idle wheel 130 is automatically moved as much as the elongated length of the disc wire 40, constantly maintaining tension of the disc wire 40.

The tension adjustment unit 140 includes: a fixed plate 143 provided by vertically protruding from an inner side of the casing 150; and a guide rod 145, an end of which is mounted to the fixed plate 143, the guide rod being provided by extending in a longitudinal direction of the casing 150.

A moving plate 141 is moveably mounted on the guide rod 145, and connected to a central shaft of the idle wheel 130, with the moving plate 141 mounted integrally to the idle wheel 130.

In this case, a spring 147 is elastically provided between the moving plate 141 and the fixed plate 143, and the idle wheel 130 moves with the moving plate 141 to constantly maintain tension of the disc wire 40.

Here, it is preferred that with the idle wheel in constant tension, the idle wheel 130 is rotated by the disc wire 40. In this case, the idle wheel is efficiently rotated by the driving force of the disc wire 40 due to friction generated between the disc wire 40 and the idle wheel 130.

Accordingly, the tension adjustment unit 140 is required to be constructed in consideration of the mounted state of the idle wheel 130, the movement of the idle wheel 130, and breaking of the disc wire 40.

Additionally, as provided in a normal disc wire driving device 100, the casing 150 is required to house therein components such as the drive sprocket 120 and the idle wheel 130 for protecting them.

In addition, the casing 150 includes: the disc wire inlet 151 to introduce the disc wire 40; and the disc wire outlet 153 through which the disc wire 40 is discharged after the disc wire 40 introduced to the casing 150 passes over both the drive sprocket 120 and the idle wheel 130.

Meanwhile, the tension measurement unit 160 includes a gauge hole 161 having a scale 163 and provided at a predetermined position of the casing 150, the gauge hole being configured in a longitudinal hole shape in the same direction as a moving direction of the idle wheel 130.

In addition, the tension measurement unit 160 includes an indication protrusion 165 provided by extending from the moving plate 141 of the tension adjustment unit 140, the indication protrusion protruding through the gauge hole 161 from the moving plate 141.

In this case, when the disc wire 40 passes over both the drive sprocket 120 and the idle wheel 130 located in the casing 150, the moving plate 141 of the tension adjustment unit 140 is moved to keep the disc wire 40 tense.

That is, with the disc wire 40 kept tense, by elastically moving the moving plate 141 away from the fixed plate 143, the distance between the moving plate 141 and the fixed plate 143 increases, and at the same time, tension is produced in the spring 147.

In the configuration mentioned above, when electric power is applied to the drive motor 110, the drive sprocket 120 rotates, the discs 43 of the disc wire 40 engage with the protrusions 121 of the drive sprocket 120, and thus the disc wire 40 moves.

In other words, during movement of the disc wire 40, tension is produced in the disc wire 40 and the disc wire 40 may increase in length. When the length of the disc wire 40 increases, the idle wheel 130 is moved to the fixed plate 143 by an elastic force of the spring 147, thereby maintaining tension of the disc wire 40.

Furthermore, the moving types of the idle wheel 130 moved by the tension adjustment unit 140 include a conveyer chain type and a screw type.

According to the configuration of the present invention, when tension generated in the disc wire 40 accumulates, and the moving plate 141 cannot be moved any longer, to timely deal with the elongation of the disc wire 40 caused by accumulation of the tension, the driving device 100 enables a user to recognize such a problem, thereby preventing the disc wire 40 from slipping from the drive sprocket 120 during operation of the drive motor 110.

Furthermore, when the elastic force of the spring 147 reaches a critical point, or when the elongated spring 147 is not restored to its original position, or when the spring cannot pull the moving plate 141 any longer, by using the indication protrusion 165 provided by extending from the moving plate 141, a user checks the scale 163 of the position of the indication protrusion 165 moved along the gauge hole 161. Then, the user may remove the discs 43 and the wire 41 of the disc wire 40 as a distance as corresponding to the moving distance of the indication protrusion 165, thereby repairing and maintaining the disc wire 40.

By proposing the driving device configured as mentioned above according to present invention, the time when the disc wire is elongated due to a long period of use can be identified with a naked eye. Accordingly, a user can easily determine when repair and maintenance of the disc wire are needed and when adjustment of the idle wheel is needed, thereby preventing the driving device 100 from being damaged.

A reference numeral 111 in the drawing denotes a normal deceleration motor.

Accordingly, although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fodder-feeding disc wire driving device having the tension management unit, the driving device comprising:
   a drive motor;

a drive sprocket having multiple protrusions on a circumference thereof, the drive sprocket being rotatable by being connected to a drive motor, wherein discs provided on a disc wire engage with the multiple protrusions so that the disc wire conveys fodder;

an idle wheel provided at a position adjacent to the drive sprocket such that the disc wire moved by the drive sprocket passes over the idle wheel, wherein the idle wheel is rotated by a rotational force of the drive sprocket transmitted to the idle wheel by the disc wire;

a tension adjustment unit connected to a central shaft of the idle wheel, the tension adjustment unit being movably provided on a line extending between a central axis of the drive sprocket and a central axis of the idle wheel, wherein the tension adjustment unit constantly maintains tension of the disc wire by moving the idle wheel away from the drive sprocket by using an elastic force of a spring;

a casing having a disc wire inlet and a disc wire outlet so that after the disc wire is introduced into the casing, and passes over both the drive sprocket and the idle wheel, the disc wire is discharged from the casing, with the drive motor, the drive sprocket, the idle wheel, and the tension adjustment unit being put in the casing; and a tension measurement unit mechanically provided between the casing and the tension adjustment unit, the tension measurement unit enabling tension state of the disc wire to be checked by naked eye, and enabling determination of when maintenance of the disc wire and adjustment of the idle wheel are required, wherein the tension measurement unit includes:

a gauge hole having a scale and provided at a predetermined position of the casing, the gauge hole being configured in a longitudinal hole shape in the same direction as a moving direction of the idle wheel; and an indication protrusion provided by extending from a moving plate of the tension adjustment unit, the indication protrusion protruding through the gauge hole from the moving plate.

2. A fodder-feeding disc wire driving device having the tension management unit, the driving device comprising:

a drive motor;

a drive sprocket having multiple protrusions on a circumference thereof, the drive sprocket being rotatable by being connected to a drive motor, wherein discs provided on a disc wire engage with the multiple protrusions so that the disc wire conveys fodder;

an idle wheel provided at a position adjacent to the drive sprocket such that the disc wire moved by the drive sprocket passes over the idle wheel, wherein the idle wheel is rotated by a rotational force of the drive sprocket transmitted to the idle wheel by the disc wire;

a tension adjustment unit connected to a central shaft of the idle wheel, the tension adjustment unit being movably provided on a line extending between a central axis of the drive sprocket and a central axis of the idle wheel, wherein the tension adjustment unit constantly maintains tension of the disc wire by moving the idle wheel away from the drive sprocket by using an elastic force of a spring;

a casing having a disc wire inlet and a disc wire outlet so that after the disc wire is introduced into the casing, and passes over both the drive sprocket and the idle wheel, the disc wire is discharged from the casing, with the drive motor, the drive sprocket, the idle wheel, and the tension adjustment unit being put in the casing; and a tension measurement unit mechanically provided between the casing and the tension adjustment unit, the tension measurement unit enabling tension state of the disc wire to be checked by naked eye, and enabling determination of when maintenance of the disc wire and adjustment of the idle wheel are required, wherein the tension adjustment unit includes:

a fixed plate provided by vertically protruding from an inner side of the casing;

a guide rod, an end of which is mounted to the fixed plate, the guide rod being provided by extending in a longitudinal direction of the casing;

a moving plate moveably mounted on the guide rod, and connected to a central shaft of the idle wheel; and a spring elastically provided between the moving plate and the fixed plate, the idle wheel moving with the moving plate and constantly maintaining tension of the disc wire.

\* \* \* \* \*